(12) United States Patent
Osborn et al.

(10) Patent No.: US 7,654,031 B2
(45) Date of Patent: Feb. 2, 2010

(54) TROLLING APPARATUS AND METHOD OF USE

(76) Inventors: Allen Odah Osborn, 2107 W. 15th Ave., Kennewick, WA (US) 99337; Dorothy Darlene Osborn, 2107 W. 15th Ave., Kennewick, WA (US) 99337

( * ) Notice: Subject to any disclaimer, the term of this patent is extended or adjusted under 35 U.S.C. 154(b) by 532 days.

(21) Appl. No.: 11/290,391

(22) Filed: Nov. 30, 2005

(65) Prior Publication Data
US 2007/0119091 A1  May 31, 2007

(51) Int. Cl.
*A01K 19/00* (2006.01)
(52) U.S. Cl. .................................... 43/43.12
(58) Field of Classification Search ............... 43/42.22, 43/42.49, 43.12, 43.13, 44.87, 44.88; D22/126, D22/145, 146
See application file for complete search history.

(56) References Cited

U.S. PATENT DOCUMENTS

| | | | |
|---|---|---|---|
| 3,698,121 A | 10/1972 | Nordeen | |
| 4,028,839 A * | 6/1977 | Stubblefield | 43/43.13 |
| 4,069,611 A * | 1/1978 | Dusich et al. | 43/43.12 |
| 4,173,091 A | 11/1979 | Emory, Jr. | |
| 4,212,127 A * | 7/1980 | Daniels | 43/43.12 |
| 4,237,644 A * | 12/1980 | Hansen | 43/43.13 |
| 4,254,573 A * | 3/1981 | Mastropaolo | 43/43.13 |
| 4,395,841 A * | 8/1983 | Cudnohufsky | 43/43.12 |
| 4,428,139 A | 1/1984 | Henze et al. | |
| 4,486,970 A * | 12/1984 | Larson | 43/43.13 |
| 4,581,842 A * | 4/1986 | Kalberer | 43/43.13 |
| 4,941,281 A * | 7/1990 | Vitale et al. | 43/43.12 |
| 5,018,296 A * | 5/1991 | Putz, II | 43/43.12 |
| 5,197,223 A * | 3/1993 | Spurgeon | 43/43.12 |
| D340,107 S * | 10/1993 | Weber | D22/145 |
| 5,867,932 A * | 2/1999 | Reiger | 43/43.13 |
| 6,016,622 A * | 1/2000 | Even | 43/43.13 |
| 6,658,784 B1 * | 12/2003 | Mastropaolo | 43/43.13 |
| 7,178,284 B2 * | 2/2007 | Chamberlain | 43/43.12 |

* cited by examiner

*Primary Examiner*—Kimberly S Smith

(57) ABSTRACT

A trolling apparatus and method of use are provided. According to one aspect, a trolling apparatus includes a frame including an upper line guide positioned toward a rear portion of the frame and operable to engage a fishing line during a release state and a lower line guide coupled to the rear portion of the frame and operable to engage the fishing line during a retained state. The apparatus further includes a line retainer operable to be coupled to a holder aft of the lower line guide and a release mechanism operable to engage a portion of the line retainer to provide the retained state and the released state.

20 Claims, 4 Drawing Sheets

TROLLING APPARATUS AND METHOD OF USE

FIELD OF THE DISCLOSURE

The present invention generally relates to fishing technology, and more particularly, to a trolling apparatus and method of use.

BACKGROUND

Fishing in deep waters has historically presented challenges for leisure and commercial fishermen. To achieve fishing at several hundred feet requires the use of very heavily weighted fishing lines and downrigging equipment to produce a desired depth. Additionally, the fishing line being used needs to withstand increased tension leaving the user with having to use a heavier and more costly pound test line. This is both difficult to manage and can lead to large increases in cost in fishing gear.

In recent years, the use of a trolling device has been predominantly explored for submerging a line to a desired depth. A trolling device allows an individual to temporarily attach fishing line and a bait to weighted trolling device that dives to a certain depth and is attached to a separate line usually made of steel. When a fish attacks a bait or lure, the line is disengaged from the trolling device and the fisherman is able to fight and retrieve the fish while the trolling device remains in the water. With the trolling device in the water, the fish potentially becomes entangled with the trolling device unless the trolling device is quickly retrieved. From time to time, the trolling device may also get entangled in a motors engine or propeller leaving a boat operator with having to untangle the line in potentially rough seas.

Some conventional solutions to entanglement include using booms that extend laterally from the side of a boat and keep the trolling device away from a fishing line after a fish is attached and can be retrieved away from the line with the fish on it as the fisherman fights the fish. This solution can also be costly requiring extensive rigging for fishing. Other solutions include utilizing a secondary motor such as a small gas engine to provide thrust for trolling reducing any potential mishaps with the primary boat engine. This solution is also costly and requires an additional investment. As such, what is needed is a cost effective efficient apparatus and method of fishing at great depths.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

A trolling apparatus for fishing is provided. The trolling apparatus includes a frame including an upper line guide positioned toward a rear portion of the frame and operable to engage a fishing line during a release state and a lower line guide coupled to the rear portion of the frame and operable to engage the fishing line during a retained state. The apparatus further includes a line retainer operable to be coupled to a holder aft of the lower line guide and a release mechanism operable to engage a portion of the line retainer to provide the retained state and the released state.

According to another aspect of the invention, a method of fishing using a trolling apparatus. The method includes providing a fishing line having an end portion and a line retainer displaced at a distance from the end portion and displacing the line through a forward line guide of a trolling apparatus and an upper and lower rear line guide of the trolling apparatus. The method further includes coupling the line retainer to a release mechanism operable to provide a retained state and a released state, the retained state maintaining the line proximal to a lower rear line guide and the retained state enabling the line to move proximal to the upper rear line guide. The method also includes lowering the fishing line and the trolling apparatus to a depth.

In a particularized form, a trolling apparatus for fishing is provided. The apparatus includes a main body portion including a front line guide dorsal fin and a rear line guide dorsal fin and a length there between and a flanged portion coupled along the length and operable to mount a front line guide, a lower rear line guide and an upper rear line guide to the main body. The flanged portion includes a front flange spaced at a distance from the front line guide dorsal fin and mounting the front guide between the front flange and the front line guide dorsal fin of the main body and a rear flange spaced at a distance from the rear line guide dorsal fin and mounting the lower rear guide and the upper rear guide between the rear flange and the rear line guide dorsal fin of the main body, the lower rear and the upper rear guide operable to maintain a fishing line there between before and after detecting a fish striking a bait coupled to the fishing line.

Figures 1, 1A:
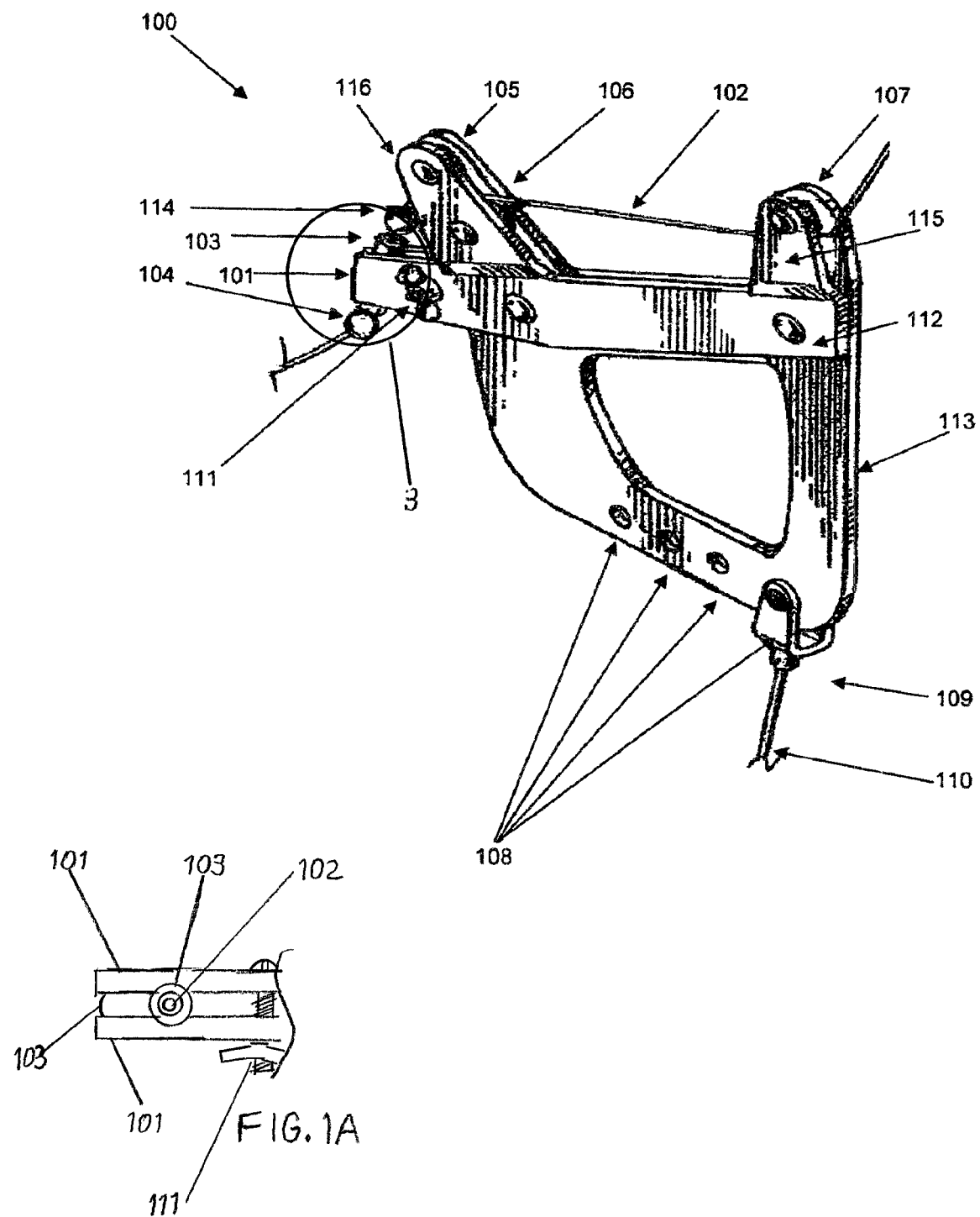
FIG. 1 illustrates a trolling apparatus according to one aspect of the present invention.
FIG 1A illustrates release mechanism (101).

FIG. 1 illustrates a trolling apparatus according to one aspect of the present invention. A trolling apparatus, illustrated generally as trolling apparatus 100, includes a main body 113 and a flanged portion 112 coupled to an upper portion of trolling apparatus 100. Main body 113 and flanged portion 112 may be coupled using various coupling mechanisms such as riveted, welded, fused, bonded using an adhesive, or any other type of coupling mechanism.

Trolling apparatus 100 further includes a line retainer 101 operable to retain a fishing line or fishing line holder 103 when coupled to line retainer 101. A rear flange 116 includes a rear upper line guide 105 and a lower line guide 106. Front flange portion 115 includes a forward line guide 107. Trolling apparatus 100 further includes a variable tension control mechanism 111 for varying tension placed on fishing line holder 103 when placed within line retainer 101. A variable depth control system 108 is also provided along a lower portion of main body 113 and allows for connecting, tying, or coupling of one or more weight line(s) 110 to vary depth of trolling apparatus 100.

During use, a user prepares for use of trolling apparatus 100 by placing fishing line 102 through forward line guide 107 and between rear upper line guide 105 and rear lower line guide 106. Fishing line 102 is then rigged with a first bead 114, a second bead 104 and a line holder 103 placed in between. A fishing lure, weight(s), leader, swivel, rig, hook(s), etc. may then be fixed to the end of fishing line 102.

Line holder 103 may include various types of materials including plastics, metals, rubbers, etc. having various lengths and diameters. For example, line holder 103 may include a hollow rubber or plastic tube that allows passage of fishing line 102. In one form, rubber tubing may include a plastic or rubber tubing similar to a vacuum tubing, surgical tubing, etc. and may include an outer diameter sufficient to allow passage through rear line guide 105 and or front line guide 107. However, in other embodiments, line holder 103 may include an outer diameter that does not allow for line holder 103 to pass through either rear line guide and/or front line guide.

"Line 102 passes through bead, then tubing, then bead, 203 feet, and bead can slide up and down and a swivel is used to stop passage of the line 102."Bead can be on the inside of the rubber tubing, similar to surgical tubing. First bead 114 and second bead 104 may also be made of various materials such as plastic, lead, alloys, etc. and may slidingly engage fishing line 102. For example, fishing line 102 may be coupled to a leader, swivel, etc. allowing first and second beads to slide along line 102 when in a released state. Fishing line 102 having a swivel or leader provides a stop or obstruction along fishing line 102 using second bead 104 and maintains trolling apparatus 100 at a distance from a fish when in a released state.

In another form, first bead 114 and or second bead 104 may be crimped or fixed to fishing line 102 to trolling apparatus 100 at a distance from a fish when in a released state. In another aspect, line holder 103 may include a rubber or plastic tubing material sized to allow first bead 114 and/or second bead 104 within line holder 103. In this manner, fishing line holder 103 may be maintained proximal to trolling apparatus 100 when in a released state and fishing line holder 103 may not slide along fishing line 102 towards a fisherman having a rod and reel which may keep line holder 103 from getting lodged or bound.

Upon preparing fishing line 102, line holder 103 is then placed within line retainer 101 and variable tension control mechanism 111 may be adjusted to apply tension to line holder 103 to maintain trolling apparatus 100 to an approximate fixed position along fishing line 102 and a user may then drop trolling apparatus 100 into a lake, stream, river, ocean, etc. and allow trolling apparatus 100 to descend to a specific depth based on weight provided using variable depth control system 108 and weight assembly(s) 109.

Upon a user trolling with trolling apparatus 100 and a fish is attracted or takes a bait coupled to fishing line 102, a fish places tension on fishing line 102 and fishing line holder 103 is released from line retainer 101 placing trolling apparatus 100 in a released state and allowing trolling apparatus 100 to slide along fishing line 102. Additionally, fishing line 102 may contact rear upper line guide 105 and/or rear lower line guide 106 depending on the relative position of a fish when attached to fishing line 102. Through maintaining trolling apparatus 100 coupled to fishing line 102, trolling apparatus 100 advantageously provides additional weight on fishing line 102 which causes a fish to tire or wear quicker resulting in less time required to fight a fish and increasing the amount of time and/or number of times trolling apparatus 100 may be used. In this manner, trolling apparatus 100 is provided as a single-line delivery system that does not require the use of additional downrigging equipment or separate lines to displace and retrieve trolling apparatus 100. However, in one embodiment, a user may employ a downrigger system (not expressly shown) to be used with trolling apparatus 100 if desired.

In one embodiment, trolling apparatus 100 may be maintained along fishing line 102 if fishing line 102 located aft of trolling apparatus 100 is compromised. For example, fishing line 102 may be compromised due to an entanglement, improper drag setting on a fishing real, attracting too large of a fish, utilizing fishing line insufficient to sustain capturing a fish or a line test that is too light, using a non-metallic leader or non-abrasive resistant leader for fish having teeth, or any combination of conditions. When fishing line 102 aft of first bead 114, fishing line holder 103 and/or second bead 104 is compromised or broken, first bead 114 and/or second bead 104 may be provided with a diameter sufficient to not allow passage of first bead 114, fishing line holder 103 and/or second bead 104 through rear line guide 116. As such, if fishing line 102 is compromised, first bead 114 may be placed up against rear line guide 105 and trolling apparatus 100 may be retrieved by a fisherman. In this manner, trolling apparatus 100 may be reused based by a fisherman reducing replacement cost for trolling apparatus 100.

Trolling apparatus 100 may be formed from various materials or combinations of materials as needed. For example, main body 113 may be formed using a rust-proof or resistant material such as aluminum, composite, plastic, etc. such that trolling apparatus 100 may be used in salt water, freshwater, brackish waters, etc. Additionally, trolling apparatus 100 may be formed using various manufacturing processes including, but not limited to, molding processes, machining processes, plastic extrusion processes, or any other process to form any portion of trolling apparatus 100.

In one embodiment, trolling apparatus 100 may be formed of aluminum or an aluminum alloy having a size or gauge sufficient to provide a weight of less than four (4) ounces and capable of providing an overall fishing depth of approximately one hundred (100) feet deep without the use of additional weight(s). For example, the overall size and shape of trolling apparatus 100 allows for efficient diving or decent with minimal weight being attached. This allows for a fishing lure attached to fishing line 102 to effectively move up, down, left, right, wobble, etc. as desired while being fished at a desired depth without having any drag that may be caused by additional weight. Other stocks of aluminum or aluminum alloys and the overall size and shape of trolling apparatus 100 may be considered depending on the type of waters being fished, desired fish to be caught, desired presentation, depth of water to fish, etc.

Portions of trolling apparatus 100 may also be provided using various combinations of materials. For example, one or more type of bead may be used for first bead 114 and/or second bead 104. First bead 114 and/or second bead 104 may include a metallic or lead weight, such as a split shot, that may surround fishing line 102 and may be crimped in place using pliers. However, in another embodiment, first bead 114 and/or second bead 104 may include a plastic, rubber, glass, etc. material having an aperture for threading fishing line 102. Each bead may also include a coupling mechanism along either side of the aperture to secure each bead to fishing line 102. In another embodiment, first bead 114 and/or second bead 104 may slidingly engage fishing line 102 such that a clicking or rattling is provided to attract fish. Multiple beads may also be placed along fishing line 102 to provide an audio noise (i.e. clicking, rattling) and or to provide a visual effect for attracting fish. For example, beads placed along fishing line 102 and/or any other part of trolling apparatus 100 may include a specific color to attract a specific type of fish.

In one embodiment, it may be advantageous for trolling apparatus 100 to be camouflaged such that a fish may not be able to see trolling apparatus 100. However, in other embodiments and various fishing conditions, it may be advantageous for a fish to see trolling apparatus 100. As such, trolling apparatus 100 may be providing in a variety of colors and used based on different types of fishing conditions, water types, water color, type of fish to attract, or any other type of fishing condition. Trolling apparatus 100 may also be used with various types and sizes of fishing line 102 including, but not limited to, filament lines, monofiliment lines, steel lines, ". . . braided lines, PROLINE™, or any other type of line having a variety of weight ratings . . . "ranging from two (2) pound test to one hundred (100) or more pound test as needed. Various types of weights and sizes may also be attached to or provided as a part of, weight assembly 109. For example, led-based and/or lead free/environmentally safe weights may be used.

Figure 2A:
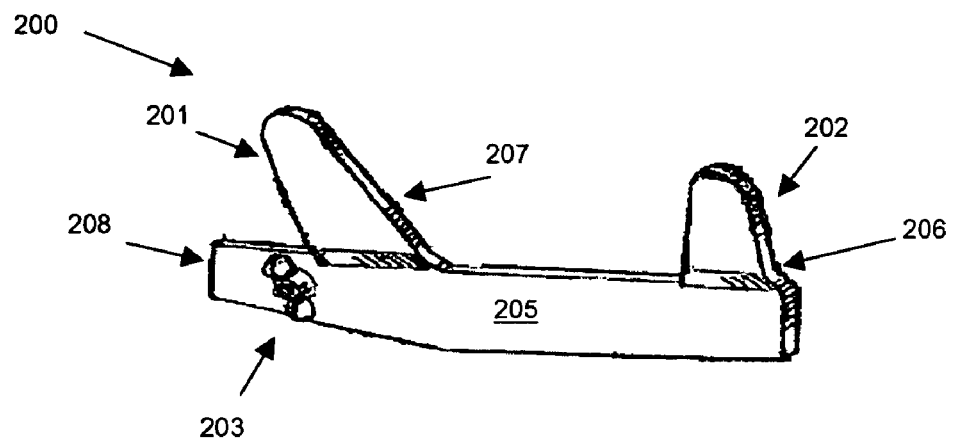
FIG. 2A illustrates an expanded view of an upper guide portion of a trolling apparatus according to one aspect of the invention.

FIG. 2A illustrates an expanded view of a flange portion of a fishing trolling according to one aspect of the invention. A flange portion, illustrated generally at 200, is provided in association with a fishing trolling apparatus such as trolling apparatus 100 of FIG. 1 or trolling apparatus 300 of FIG. 3 and includes a rear flange 201 having a rear flange taper 207 and a front flange 202 including a front flange taper 206. Rear flange 201 is connected to front flange 202 via flange cross member 205. Front flange 202 and rear flange 201 are also offset from flange cross member 205 to produce a gap when coupled to a main body as described below. Flange cross member 205 is also coupled to a line retainer member 208 operable to be used in association with retaining a fishing line and/or fishing line holder (not expressly shown). Tension adjuster 204 is coupled to line retainer member 208 and is operably associated with increasing or decreasing tension provided to a fishing line and/or fishing line holder to provide retained and released operating states. Line retainer member 208 may also be offset from flange crossmember 205 as needed. Tension adjuster 204 as illustrated includes a wing nut adjuster coupled to a threaded bolt for varying tension of a line retainer. Tension adjuster 204 may also be provided in other forms to allow an increase or decrease in tension of a line retainer as needed.

Figure 2B:
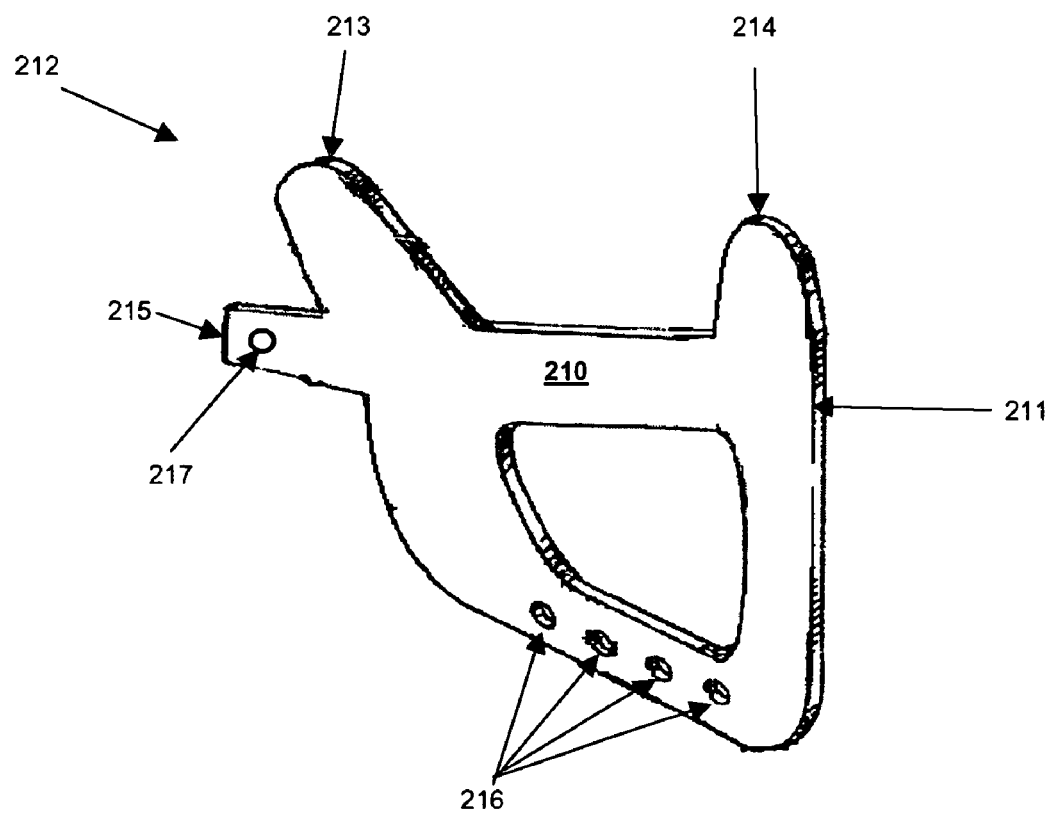
FIG. 2B illustrates an expanded view of an upper guide portion of a trolling apparatus for use with the flange portion of FIG. 2B according to another aspect of the invention.

FIG. 2B illustrates an expanded view of a main body portion of a trolling apparatus for use with flange portion of FIG. 2A according to another aspect of the invention. A main body portion, illustrated generally as main body 212, is provided in association with a fishing trolling apparatus such as trolling apparatus 100 of FIG. 1, trolling apparatus 300 of FIG. 3, of flange portion 200 illustrated in FIG. 2A. For example, main body 212 may be coupled to flange portion 200 to form trolling apparatus 200 or 300.

Main body 212 includes a main body rear line guide dorsal member or fin 213 coupled to a main body front line guide dorsal member or fin 214 via a main body cross member 210. Main body rear line guide dorsal fin 213 is provided having the same approximate size as rear flange 201. Similarly main body front line guide dorsal fin 214 is provided having the same approximate size as front flange 202 such that when flange portion is coupled to main body 212 each fin and flange are aligned to form a front and rear line guide. Additionally, upon coupling main body 212 and flange portion 200, flange portion 200 is offset to allow for coupling of line guides. For example, rear flange 201, front flange 202, and line retainer holder 208 are offset from flange cross member 205 such that a gap is provided when flange portion 200 and main body 212 are coupled. However, in other another embodiment, main body rear line guide dorsal fin 213 and main body front line guide dorsal fin 214 may include an offset as needed to allow for providing line guides.

Main body 212 further includes main body line retainer holder 215 provided such that it may be aligned with line retainer member 208 of flange portion 200. Main body line retainer holder 215 includes a variable tension control mounting aperture 217 for coupling a mounting bolt, screw, threaded device, coupling device, etc. for use with tension adjuster 204. For example, tension adjuster 204 includes a wing nut sized to be used with a specific bolt placed through aperture 217 of main body 212. In this manner, when tension adjuster 204 is varied, a distance between main body line retainer holder 215 and line retainer holder 208 allowing for increasing and decreasing tension placed on a fishing line or fishing line holder (not expressly shown).

In one embodiment, main body 212 and/or flange portion 200 may include different materials having various thicknesses as needed. For example, line retainer member 208 may include a thinner material than main body line retainer 215. In this manner, when tension adjuster 204 is varied, line retainer holder 208 is displaced at a greater rate to increase or decrease tension placed on a fishing line or fishing line holder. However, in other embodiments, the same thickness may also be provided.

Figure 3:
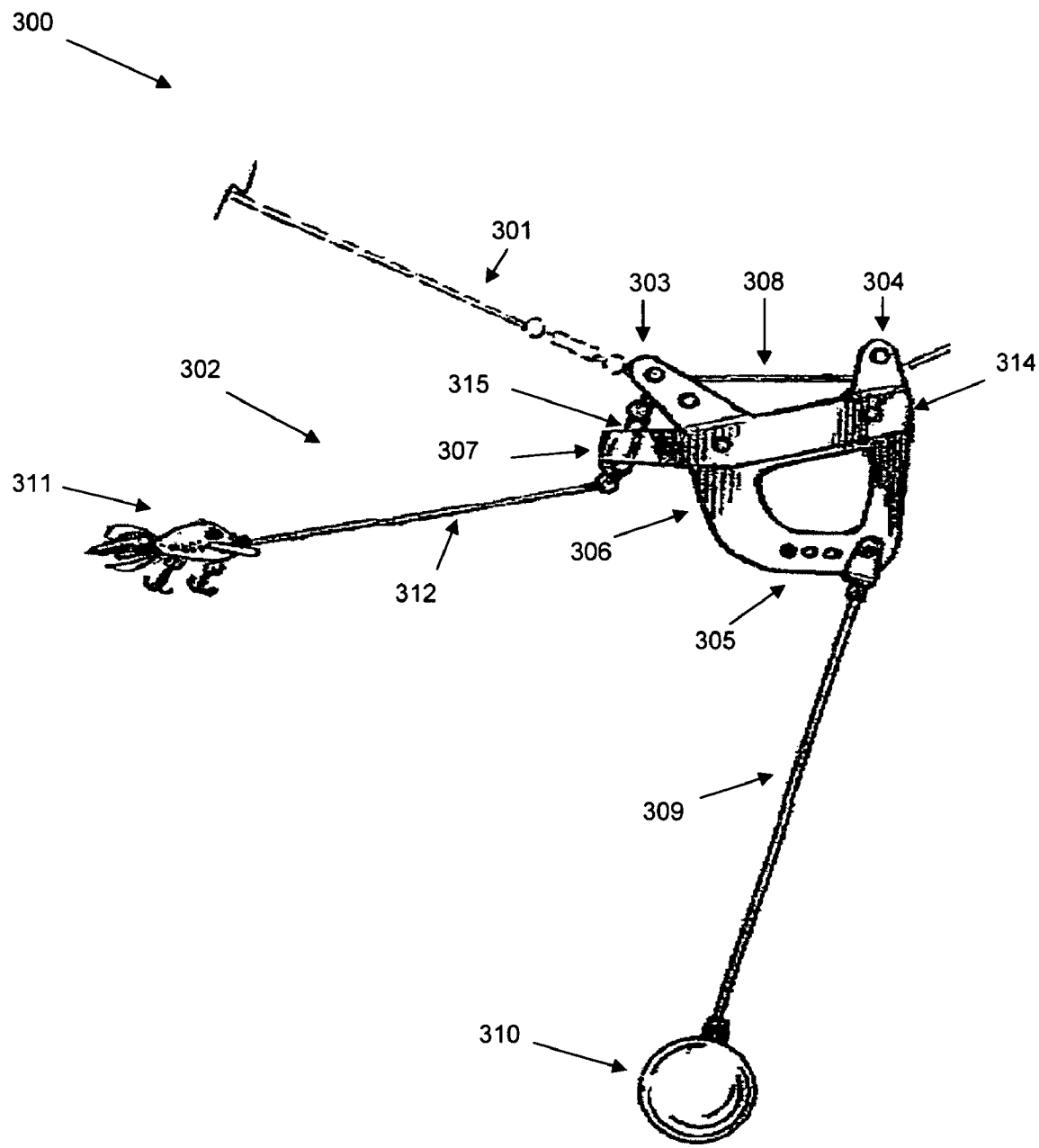
FIG. 3 illustrates use of a trolling apparatus in accordance with one aspect of the present invention.

FIG. 3 illustrates use of a trolling apparatus in accordance with one aspect of the present invention. A trolling apparatus, illustrated generally at 300, includes a main body 306 and an upper flange portion 314 including a rear line guide 303, a front line guide 304 and a line retainer mechanism 307. Trolling apparatus 300 further includes a weight assembly 309 having a weight 310 coupled to variable depth control system 305 having weight attachment mounts for mounting weights for displacing trolling apparatus 300 to a specific depth. In one form, weight assembly 309 includes a ball weight that may vary in size from 10# to 15# but lighter or heavier ball weights may also be used. Additionally, trolling apparatus 300 may also be used without a weight assembly if desired.

Fishing line 308 is displaced along trolling apparatus 300 and through front line guide 304 and rear line guide 303 and connected to fishing line holder 315. Leader 312 may be a variety of lengths based on the type of fish and depth desired and may vary from thirty-six (36) to seventy-two (72) inches. Other lengths may also be used. Leader 312 is coupled to an aft end of fishing line holder 315 and is operable to affix a bait or fishing lure 311. Line retainer mechanism 307 couples line guide assembly 313 and allows trolling apparatus 300 to be fixed in place in a retained state 301 while trolling or during use. When a proper amount of pressure or line tension is provided to fishing lure 311 (i.e. a fish strikes fishing lure or bait), line retainer mechanism 307 releases line holder 313 and allows trolling apparatus 300 to slidingly engage fishing line 308 in a released state 301. For example, released state 301 allows for trolling apparatus 300 to traverse along fishing line 308 as needed while providing additional weight or tension while a fish is attached during a released state 301.

In one embodiment, trolling apparatus 300 may include additional stabilization features to assist with streamlining movement of trolling apparatus 300 through water and various depths. For example, trolling apparatus may include horizontal guides or fin-like or horizontal guides placed approximately perpendicular to main body 306 or flange portion 314 (not expressly shown). A single or multiple sets of horizontal guides may be used. Additionally, a horizontal guide may also be variable or rotational. For example, horizontal guides may be spring or tension loaded and rotational to allow for rapid increases or decreases in pitch of trolling apparatus 300. In this manner, a reduction in turbulence or unstable utilization of apparatus 300 may be provided in each operating state allowing for increased efficiency when during use.

In one embodiment, line retainer mechanism 307 may be provided as a plastic or rubber conduit having a slot with a slot width less than the diameter of fishing line 308 and/or leader 312. A slot may be provided along the rear or aft portion of line retainer mechanism 307 and fishing line 308 and/or leader 312 may be retained within conduit until a fish takes bait 311. When a fish strikes bait 311, fishing line 308 or leader 312 is forced through the slot and disengaged from line retainer mechanism 307. In this manner, a variable tension controller, such as variable tension control mechanism 111 of FIG. 1 or tension adjuster 204 of FIG. 2A may not be needed to retain fishing line 308 and/or leader 312 along a portion of trolling apparatus 300 until a fish takes bait 311. Additionally, fishing line holder 315 may not be needed. As such, trolling apparatus 300 is provided as a single-line delivery system that does not require the use of additional downrigging equipment or separate lines to displace trolling apparatus 300 to a desired depth.

Figure 4:
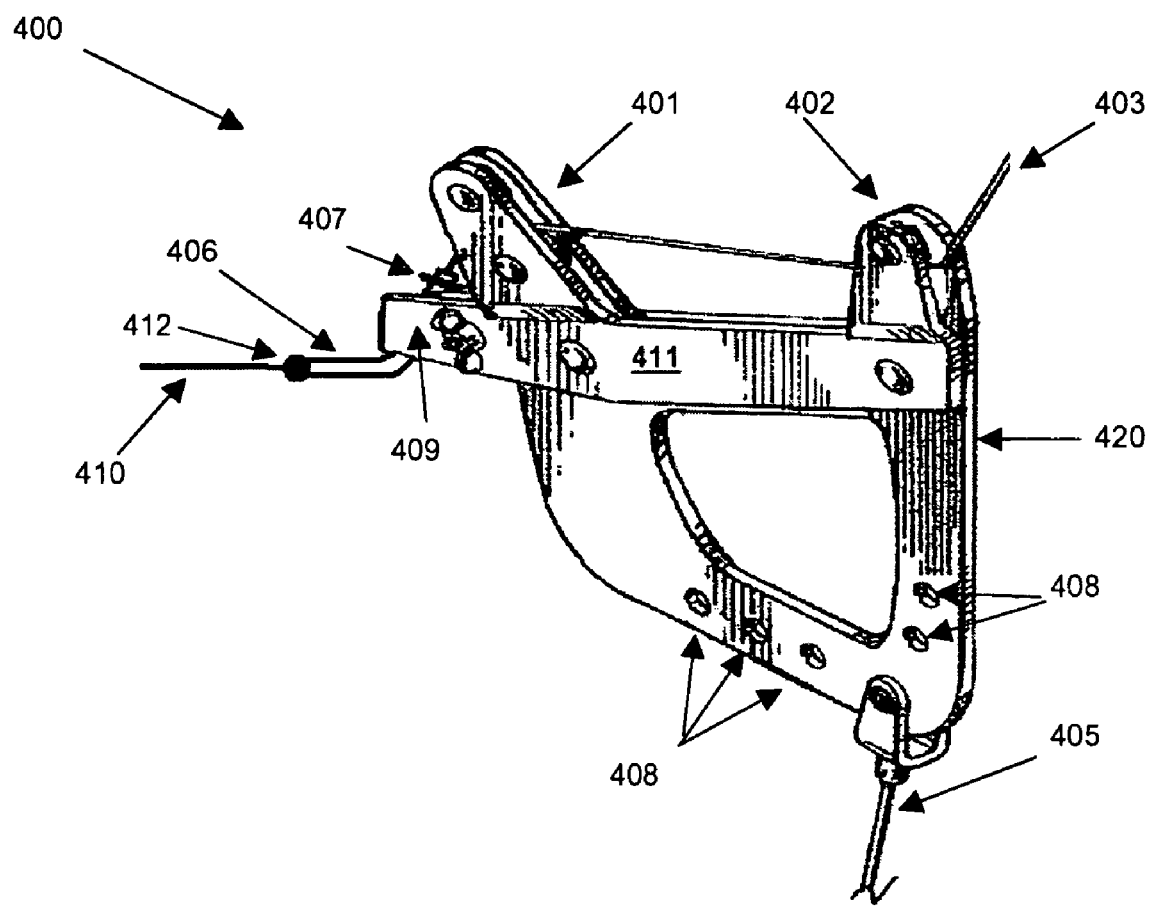
FIG. 4 illustrates an alternate embodiment of a trolling apparatus in accordance with one aspect of the present invention.

FIG. 4 illustrates an alternate embodiment of a trolling apparatus in accordance with one aspect of the present invention. A trolling apparatus, illustrated generally at 400, includes a main body 420 and an upper flange portion 411 including a rear line guide 401, a front line guide 402 and a line retainer mechanism 409. Trolling apparatus 400 further includes a weight attachment or feeler mounts 408 displaced horizontally and vertically along main body 420. A feeler (not expressly shown) may be provided as a semirigid or flexible elongated piece of plastic or metal material that extends below trolling apparatus 400 and allows for a user to determine when trolling apparatus 400 is approaching a bottom of a lake, river, etc. In this manner, trolling apparatus may not get hung or snagged when being used.

Fishing line 403 is displaced along trolling apparatus 400 and through front line guide 402 and rear line guide 401 and through elongated fishing line holder 406. Elongated fishing line holder 406 may be provided in various lengths based on a desired use for trolling apparatus 400. For example, elongated fishing line holder 406 include a length between approximately one (1) inch and two (2) inches and in one embodiment, is one and three fourths (1¾) inches in length for minimal movement or action of trolling apparatus 400 when used. In one embodiment, elongated fishing line holder 406 may include a length between three (3) or four (4) inches resulting in increased movement of trolling apparatus 400. For example, elongated fishing line holder 406 provides for side-to-side movement of trolling apparatus 400 when trolled at a specific speed and may be made of an elastic plastic or rubber material that may be bent or deformed in various directions and provide for additional action or movement of trolling apparatus 400 by generating drag or turbulent operating conditions aft of trolling apparatus 400 resulting in an overall side-to-side movement of trolling apparatus 400.

Elongated fishing line holder 406 may also include a plastic or rubber material having an outer diameter to allow passage through a portion of rear line guide 401 and or front line guide 402 as needed. As such, a user my use or cut various lengths of rubber or plastic tubing for use as elongated fishing line holder 406.

Elongated fishing line holder 406 is coupled to fishing line 403 using a coupling mechanism 407 operable to fix elongated fishing line holder 406 to fishing line 403 to keep elongated fishing line holder 406 in a fixed position. Coupling mechanism 407 may include various types of couplings and in one form includes a strap, such as a tie strap, that may be tightened or clamped around elongated fishing line holder 406 and fishing line 403. For example, elongated fishing line holder 406 may include a hollow plastic or rubber tubing material that may be compressed when coupling mechanism 407 is tightened or constricted.

Trolling apparatus 400 may also be used with a leader 410 having a swivel (not expressly shown) or other form of leader attachment and may be a variety of lengths based on the type of fish and depth desired and may vary from thirty-six (36) to seventy-two (72) inches. Other lengths may also be used. Leader 410 is coupled to an aft end of fishing line 403 extending thorough elongated fishing line holder 406 and is operable to affix a bait or fishing lure (not expressly shown). Line retainer mechanism 409 couples to elongated fishing line holder 496 and allows trolling apparatus 400 to be fixed in place in a retained state while trolling.

During use, elongated fishing line holder 406 creates turbulent conditions aft trolling apparatus 400 when trolled at a specific speed. For example, when trolling apparatus 400 is pulled at a slower speed, trolling apparatus may maintain a substantially straight path. As speed is increased, trolling apparatus 400 will begin to move from side-to-side thereby providing additional movement or action for a fishing lure attached to leader 410.

When a proper amount of pressure or line tension is provided to a fishing lure (i.e. a fish strikes fishing lure or bait), line retainer mechanism 409 releases elongated fishing line holder 406 and allows trolling apparatus 400 to slidingly engage fishing line 403 in a released state. For example, a released state allows for trolling apparatus 400 to traverse along fishing line 403 and coupling mechanism 407 keeps elongated fishing line tube 406 in place while trolling apparatus 400 is in a released state. A fish may then be retrieved and trolling apparatus 400 is allowed to move along fishing line 403 as needed.

Note that although an embodiment of the invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the invention is not intended to be limited to the specific form set forth herein, but on the contrary, it is intended to cover such alternatives, modifications, and equivalents, as can be reasonably included within the spirit and scope of the invention.

What is claimed is:

1. A fishing apparatus comprising:
   a frame including an upper line guide positioned toward a rear portion of the frame and operable to engage a fishing line during a release state and a lower line guide coupled to the rear portion of the frame and operable to engage the fishing line during a retained state; a release mechanism (101) operable to be coupled to a line holder aft of the lower line guide; and operable to receive and friction and compression engage a portion of the line to provide the retained state and the released state.

2. The apparatus of claim 1 further comprising a variable tension control mechanism operable to vary an amount of tension provided by the release mechanism to provide the retained state; the release mechanism (101) comprising two outwardly extending planar and essentially parallel members separated by a space sufficient to receive and to compress and friction retain fishing line holder (103).

3. The apparatus of claim 1 further comprising a forward line guide coupled to a front portion of the frame, the forward line guide operable to engage the fishing line during the release state and the retained state.

4. The apparatus of claim 1 further comprising a variable depth control system including at least one weight attachment mount operable to couple a weight to provide a specific trolling depth.

5. The apparatus of claim 4 wherein the variable depth control system further includes plural attachment mounts along a lower portion of the frame and operable to couple plural weights for the specific trolling depth.

6. The apparatus of claim 1 wherein at least one of the guides comprise plastic.

7. The apparatus of claim 1 further comprising:
a first bead coupled to a portion of the fishing line; a second bead coupled at a distance from the first bead; and a cylindrical shaped material surrounding the fishing line and coupled between the first and second beads, the cylindrical shaped material operable to be coupled to the release mechanism.

8. The apparatus of claim 1 wherein the frame is formed from a single piece of material.

9. The apparatus of claim 1 further comprising:
a main body portion including a front portion and a rear portion and a length there between; and a flanged portion coupled to the main body and operable to mount the front guide, the lower rear guide and the upper rear guide between the flanged portion and the main body.

10. The apparatus of claim 9 wherein the flanged portion further comprises:
a front flange spaced at a distance from the front portion, the front guide coupled between the front flange and the main body; and a rear flange spaced at a distance from the rear portion, the lower rear guide and the upper rear guide coupled between the rear flange and the main body.

11. The apparatus of claim 9 further comprising:
the release mechanism (101) formed between the main body and the flanged portion; and a tension adjuster operable to vary a width of the release mechanism (101) through varying the distance between the flanged portion and the main body.

12. The apparatus of claim 11 wherein the main body portion and the flanged portion comprise aluminum: the tension adjuster comprising a bolt extending through the two outwardly extending planar and essentially parallel members of the release mechanism (101) and tightened and loosened by a wing nut.

13. The apparatus of claim 1 further comprising:
retaining means comprising a release mechanism (101) comprising two outwardly extending planar and essentially parallel members separated by a space sufficient to receive and to compress and friction retain fishing line holder (103), for maintaining the fishing line proximal to the frame; tension adjustment means, comprising a bolt extending through the two outwardly extending planar and essentially parallel members of the release mechanism (101) and tightened and loosened by a wing nut, for varying a tension applied to the line retainer; and release means for displacing the fishing line from the frame and enabling the frame to slide along the fishing line.

14. A method of fishing using a trolling apparatus comprising:
providing a fishing line having an end portion and a release mechanism (101) displaced at a distance from the end portion; displacing the line through a forward line guide of a trolling apparatus and upper and lower rear line guides of the trolling apparatus; coupling the line retainer to the release mechanism operable to provide a retained state and a released state, the retained state maintaining the line proximal to a lower rear line guide and the retained state enabling the line to move proximal to the upper rear line guide; and lowering the fishing line and the trolling apparatus to a depth.

15. The method of claim 14 further comprising adjusting the release mechanism to alter a tension of a line retainer holder of the release mechanism.

16. The method of claim 14 further comprising coupling at least one weight to a lower portion of the trolling apparatus to provide a greater depth to displace the trolling apparatus.

17. The method of claim 14 further comprising:
enabling a fish to strike a bait attached to the end portion of the line; releasing the release mechanism (101) in response to the strike; and enabling movement of the trolling apparatus along the line upon releasing the release mechanism (101).

18. A fishing apparatus comprising:
a main body portion including a front line guide dorsal fin and a rear line guide dorsal fin and a length there between; and a flanged portion coupled along the length and operable to mount a front line guide, a lower rear line guide and an upper rear line guide to the main body, the flanged portion including: a front flange spaced at a distance from the front line guide dorsal fin and mounting the front guide between the front flange and the front line guide dorsal fin of the main body; and a rear flange spaced at a distance from the rear line guide dorsal fin and mounting the lower rear guide and the upper rear guide between the rear flange and the rear line dorsal fin of the main body, the lower rear and the upper rear guide operable to maintain a fishing line there between before and after detecting a fish striking a bait coupled to the line.

19. The apparatus of claim 18 further comprising:
a line retainer formed between the main body and the flanged portion; and a variable tension adjuster operable to vary a width of the line retainer by varying the distance between a line retainer member of the flanged portion and a main body line retainer of the main body.

20. The apparatus of claim 19 further comprising:
a first bead coupled to a portion of the fishing line; a second bead coupled at a distance from the first bead; and a cylindrical shaped material surrounding the fishing line and coupled between the first and second beads, the cylindrical shaped material operable to be placed within the line retainer.

* * * * *